(12) United States Patent
Harada et al.

(10) Patent No.: US 12,137,407 B2
(45) Date of Patent: Nov. 5, 2024

(54) TERMINAL, RADIO COMMUNICATION METHOD, AND BASE STATION

(71) Applicant: NTT DOCOMO, INC., Tokyo (JP)

(72) Inventors: Hiroki Harada, Tokyo (JP); Kazuaki Takeda, Tokyo (JP); Satoshi Nagata, Tokyo (JP); Hiroyuki Ishii, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 342 days.

(21) Appl. No.: 16/793,579

(22) Filed: Feb. 18, 2020

(65) Prior Publication Data

US 2020/0187104 A1 Jun. 11, 2020

Related U.S. Application Data

(63) Continuation of application No. 15/024,916, filed as application No. PCT/JP2014/073288 on Sep. 4, 2014, now abandoned.

(30) Foreign Application Priority Data

Sep. 26, 2013 (JP) ................................. 2013-200014

(51) Int. Cl.
*H04W 48/16* (2009.01)
*H04J 11/00* (2006.01)
*H04W 24/10* (2009.01)
*H04W 48/12* (2009.01)
*H04W 16/32* (2009.01)

(52) U.S. Cl.
CPC ......... *H04W 48/16* (2013.01); *H04J 11/0069* (2013.01); *H04J 11/0073* (2013.01); *H04J 11/0083* (2013.01); *H04W 24/10* (2013.01); *H04W 48/12* (2013.01); *H04W 16/32* (2013.01)

(58) Field of Classification Search
CPC ................. H04W 48/16; H04J 11/0069; H04J 11/0073; H04J 11/0083
See application file for complete search history.

(56) References Cited

U.S. PATENT DOCUMENTS

2015/0049649 A1* 2/2015 Zhu ....................... H04L 5/0092
370/277

OTHER PUBLICATIONS

International Search Report issued in corresponding application No. PCT/JP2014/073288 mailed Nov. 4, 2014 (3 pages).
Written Opinion of the International Searching Authority issued in corresponding application No. PCT/JP2014/073288 dated Nov. 4, 2014 (4 pages).

(Continued)

*Primary Examiner* — Faruk Hamza
*Assistant Examiner* — Alan L Lindenbaum
(74) *Attorney, Agent, or Firm* — Osha Bergman Watanabe & Burton LLP

(57) ABSTRACT

A terminal is disclosed that includes a receiver that receives, in a first cell, information indicating a measurement object including information regarding a parameter of a discovery or measurement signal. The terminal also includes a processor that performs a measurement using the discovery or measurement signal based on the information indicating the measurement object and a transmitter that transmits a result of the measurement, where when the information indicating the measurement object designates a timing that is synchronous with the first cell, the processor performs the measurement in a second cell based on the timing that is synchronous with the first cell. In other aspects, a radio communication method and a base station are also disclosed.

4 Claims, 11 Drawing Sheets

(56) References Cited

OTHER PUBLICATIONS

ETRI, "Mechanisms and signal design for small cell discovery"; 3GPP TSG RAN WG1 Meeting #74, R1-133183; Barcelona, Spain, Aug. 19-23, 2013 (4 pages).
3GPP TS 36.300 V11.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Dec. 2012 (208 pages).
3GPP TR 36.814 V9.0.0, "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (104 pages).
Office Action issued in corresponding Japanese Application No. 2013-200014, mailed Oct. 18, 2016 (7 pages).
NTT DOCOMO, Huawei, HiSilicon, ZTE, MediaTek, ETRI; "Text proposal of TR 36.872 on efficient discovery of small cells"; 3GPP TSG RAN WG1 Meeting #74, R1-133873; Barcelona, Spain; Aug. 19-23, 2013 (7 pages).
NTT DOCOMO; "Views on Benefit of Small Cell Discovery Based on Discovery Signal"; 3GPP TSG RAN WG1 Meeting #74, R1-133458; Barcelona, Spain; Aug. 19-23, 2013 (4 pages).
Office Action issued in the counterpart Japanese Patent Application No. 2013-200014, mailed Apr. 4, 2017 (12 pages).
NTT DOCOMO, et al.; "Text proposal of TR36.872 on efficient discovery of small cells"; 3GPP TSG RAN WG1 Meeting #74, R1-133963; Barcelona, Spain, Aug. 19-23, 2013 (12 pages).
NTT DOCOMO; "Small Cell Discovery for Efficient Small Cell On/Off Operation"; 3GPP TSG RAN WG1 Meeting #74, R1-133457; Barcelona, Spain, Aug. 19-23, 2013 (8 pages).
Office Action issued in the counterpart Chinese Application No. 202010321771.6, mailed Aug. 19, 2023 (15 pages).
Office Action issued in counterpart Chinese Patent Application No. 202010321771.6 mailed on Jan. 4, 2023 (13 pages).

* cited by examiner

TERMINAL, RADIO COMMUNICATION METHOD, AND BASE STATION

CROSS-REFERENCE TO RELATED APPLICATIONS

This application is a continuation application of U.S. patent application Ser. No. 15/024,916, filed on Mar. 25, 2016, which is a national phase application of PCT/JP2014/073288, filed on Sep. 4, 2014, which claims priority to Japanese Patent Application No. 2013-200014, filed on Sep. 26, 2013. The contents of these applications are hereby incorporated by reference in their entirety.

TECHNICAL FIELD

The present invention relates to a base station, a user terminal and a radio communication method in a next-generation mobile communication system.

BACKGROUND ART

In the UMTS (Universal Mobile Telecommunications System) network, the specifications of long term evolution (LTE) have been drafted for the purpose of further increasing high speed data rates, providing lower delay and so on (see non-patent literature 1). In LTE, as multiple access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

Also, successor systems of LTE (referred to as, for example, "LTE-advanced" or "LTE enhancement" (hereinafter referred to as "LTE-A")) have been under study for the purpose of achieving further broadbandization and increased speed beyond LTE. In the LTE-A system, a HetNet (Heterogeneous Network), in which small cells (for example, pico cells, femto cells and so on) having a local coverage area of a radius of approximately several tens of meters are formed within a macro cell having a wide coverage area of a radius of approximately several kilometers, is under study (see, for example, non-patent literature 2). Also, in relationship to the HetNet, a study is in progress to use carriers of different frequency bands between the macro cell (macro base station) and the small cells (small base stations), in addition to the same frequency band.

CITATION LIST

Non-Patent Literature

Non-Patent Literature 1: 3GPP TS 36.300 "Evolved UTRA and Evolved UTRAN Overall Description"
Non-Patent Literature 2: 3GPP TR 36.814 "E-UTRA Further Advancements for E-UTRA Physical Layer Aspects"

SUMMARY OF INVENTION

Technical Problem

In the above HetNet, many small cells may be placed within the macro cell. In this case, for example, it may be possible to arrange small cells in a localized manner in places where the traffic is heavy, so as to achieve an off-loading effect between the cells. Given this environment, a novel small cell discovery mechanism (small cell discovery) is under study for introduction, to provide a method of allowing user terminals to efficiently discover and connect with the small cells.

In small cell discovery, the use of new discovery/measurement signals, which are different from existing synchronization signals and measurement signals, is anticipated. Meanwhile, in the small cells, various types of signals for existing user terminals may also be transmitted in order to secure compatibility (backward compatibility) with existing systems. Consequently, how to control the small cell discovery/measurements to use various types of signals for existing user terminals and the small cell discovery/measurements using newly introduced discovery/measurement signals is the problem.

The present invention has been made in view of the above, and it is therefore an object of the present invention to provide a base station, a user terminal and a radio communication method that enable adequate radio communication even when discovery signals for existing user terminals and small cell discovery/measurement signals coexist.

Solution to Problem

The base station of the present invention provides a base station that forms a macro cell having a coverage area to include a small cell, and that communicates with a user terminal that can connect with the small cell, and this base station has a commanding section that commands, with respect to a predetermined frequency, one or both of a first discovery process to use a synchronization signal transmitted from the small cell, and a second discovery process to use a discovery/measurement signal transmitted from the small cell, to the user terminal, and a transmitting section that, when the commanding section commands the second discovery process, transmits information about the parameters of the discovery/measurement signal to the user terminal.

Advantageous Effects of Invention

According to the present invention, it is possible to carry out adequate radio communication even when discovery signals for existing user terminals and small cell discovery/measurement signals coexist.

DESCRIPTION OF EMBODIMENTS

Figure 1:
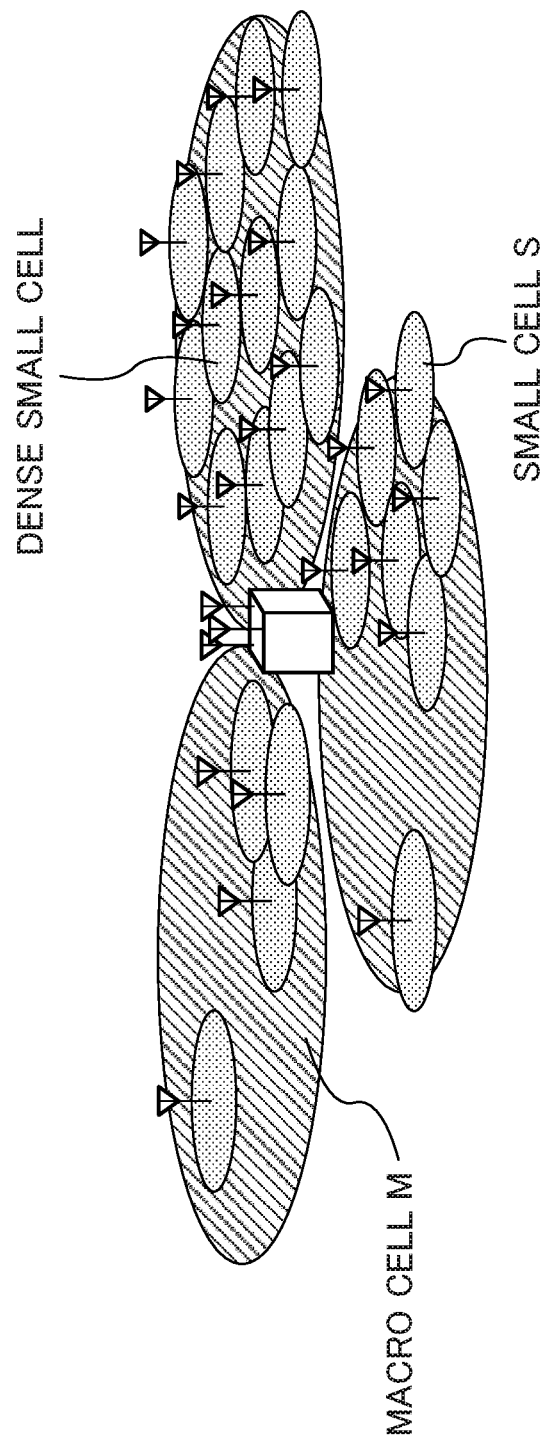
FIG. 1 is a conceptual diagram of a HetNet.

FIG. 1 is a conceptual diagram of a HetNet that is anticipated in Rel. 12 and later versions. As shown in FIG. 1, a HetNet refers to a radio communication system in which macro cells and small cells are arranged to overlap each other geographically at least in part. A HetNet is comprised of a radio base station that forms a macro cell (hereinafter referred to as a "macro base station"), radio base stations that form small cells (hereinafter referred to as "small base stations"), and a user terminal that communicates with the macro base station and the small base stations.

Generally speaking, the distribution of users and traffic are not fixed, but change over time or between locations. Consequently, when many small cells are placed within a macro cell, the small cells may be arranged in such a manner that their density and environment vary (sparse and dense) between locations. For example, in train stations, shopping malls and so on where many user terminals gather, it may be possible to increase the density to place small cells (dense small cells). By placing small cells densely and in a localized manner (in clusters) in places where the traffic is heavy, it is possible to achieve an off-loading effect between the cells.

Given this environment, a study is in progress to introduce a novel small cell discovery mechanism (small cell discovery) to provide a method of allowing user terminals to efficiently discover and connect with the small cells. In small cell discovery, a study is in progress to carry out small cell discovery/measurements by using new small cell discovery/measurement signals (also referred to as "discovery signals (DSs)"), instead of using conventional cell discovery signals (synchronization signals (PSS/SSS)) and measurement signals (cell-specific reference signals (CRS)).

Figure 2:
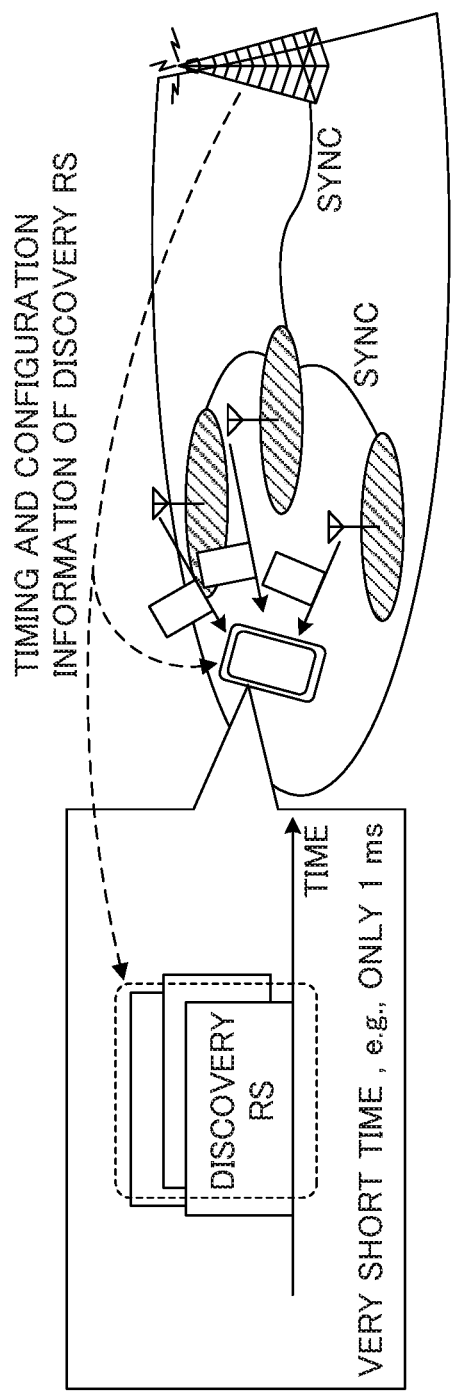
FIG. 2 is a diagram to explain example DS transmission timings in small cell discovery.

For example, it may be possible to transmit a discovery/measurement signal (DS) from a small cell in a long cycle, and, based on the receiving state (RSRP, RSRQ, etc.) reported from a user terminal having detected that DS, control the connection of the user terminals with the small cell. In this case, it may be possible that DSs are transmitted from a plurality of small cells simultaneously, in predetermined durations in a long cycle (synchronous transmission) (see FIG. 2). By this means, even when small cells are placed in a high density, it is possible efficiently determine the cell to which a user terminal connects, and prevent the increase of overhead.

Meanwhile, even when such a small cell discovery mechanism is introduced, it may be likely that compatibility with existing systems (for example, Rel. 11 and earlier versions) is maintained. Consequently, while small cell discovery/measurement signals are introduced, existing cell discovery signals (PSS/SSS) and measurement signals (CRS) for existing user terminals (legacy UEs) are also likely to be transmitted as heretofore.

Figure 3:
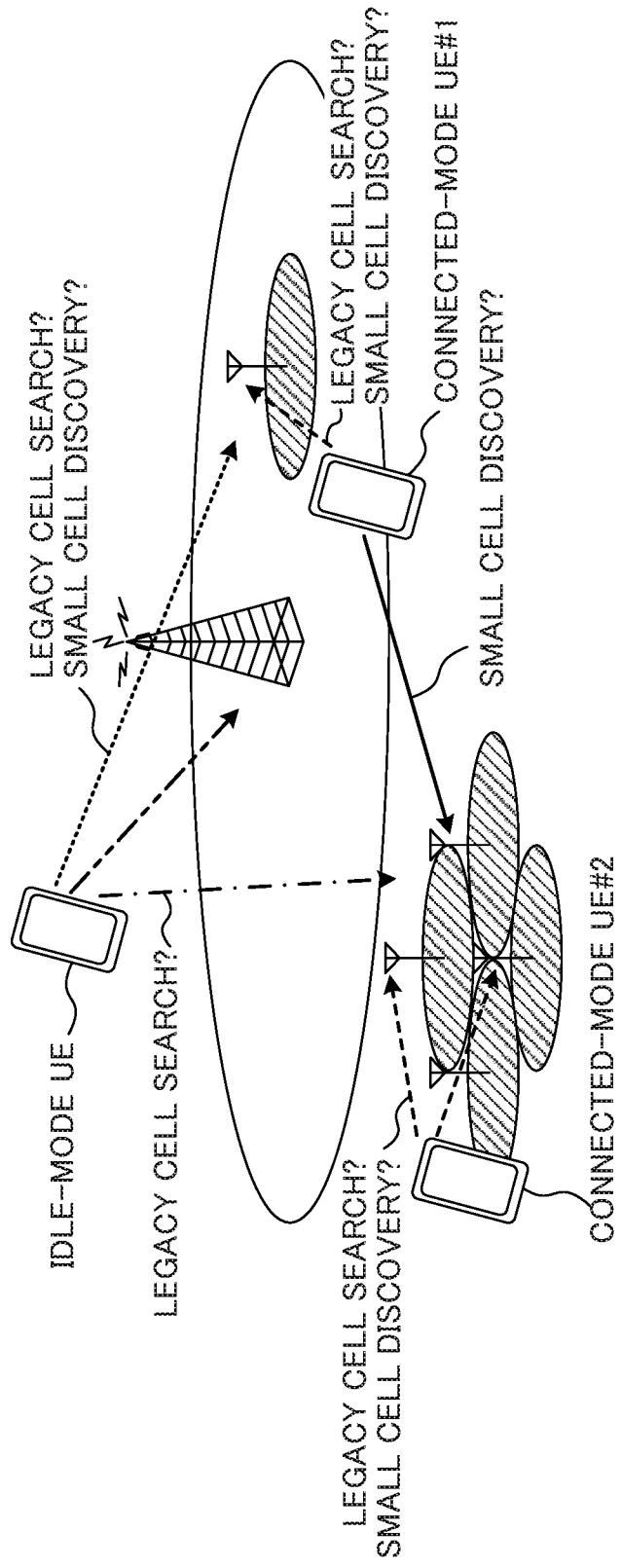
FIG. 3 is a diagram to explain an overview of small cell discovery and legacy cell search.

In this case, a user terminal to support Rel. 12 can use the existing mechanism (existing legacy cell search to use cell discovery signals (PSS/SSS) and measurement signals (CRSs)) and also use the new mechanism (small cell discovery to use DSs). However, the specific operation method of a user terminal in every situation is not determined, and is the subject of further discussion (see FIG. 3).

For example, assume a case in which, in a system in which small cells and macro cells overlap, a user terminal to support Rel. 12 implements only the small cell discovery mechanism using DSs (hereinafter also referred to as "small cell discovery"). In this case, the small cell discovery mechanism to use DSs has to be a mechanism to support operation in all existing LTE scenarios (macro cell discovery, user terminals in idle mode, user terminals in high speed motion, etc.). Consequently, similar to the PSS/SSS/CRS, DSs need to be transmitted repeatedly, in a short cycle, and therefore the interference between small cells and the overhead increase.

Consequently, it may be possible that even user terminals of Rel. 12 not only use the small cell discovery mechanism to use DSs, but also use existing cell discovery signals (PSS/SSS) and measurement signals (CRSs). That is, there are cases where, depending on the situation of the subject terminal, a user terminal carries out DS-based measurements as supplementary measurements, in addition to measurements based on existing cell discovery signals (PSS/SSS) and measurement signals (CRSs), or carry out DS-based measurements alone.

In the former case, the result of measurements using the PSS/SSS/CRS and the result of measurement using DSs both exist, and what control should be executed using both measurement results is the problem. For example, in the user terminal, the problem is how to control the conditions for transmitting measurement reports in response to the legacy cell search measurement result and the DS-based small cell discovery measurement result (the contents to transmit, whether or not to transmit (event trigger), etc.).

Meanwhile, even when discovery/measurements are carried out using DSs alone (the latter case), how to control the conditions for transmitting small cell discovery commands for user terminals and measurement reports in response to measurement results poses a problem.

Also, when a user terminal to support Rel. 12 carries out both legacy cell search (cell discovery using the PSS/SSS and RSRP/RSRQ measurements using CRSs) and small cell discovery (cell discovery and RSRP/RSRQ measurements using DSs) all the time, there is a possibility that the load in the user terminal increases.

So, assuming the case where existing cell discovery signals (PSS/SSS) and measurement signals (CRSs) are used (legacy cell search), the present inventors have come up with the idea of controlling the operation of a user terminal adequately, by controlling small cell discovery to use DSs. For example, the present inventors have arrived at commanding small cell discovery using DSs and/or legacy cell search from the base station to which the user terminal is connected, and also reporting information about DS parameters to the user terminal when small cell discovery is executed.

Now, the present embodiment will be described below. Note that, with the present embodiment, the frequency which the macro cell employs (F1) and the frequency which the small cells employ (F2) may be the same frequency (intra-frequency), or may be different frequencies (inter-frequency).

First Embodiment

A case will be described below with a first example where a user terminal carries out small cell discovery in a predetermined frequency based on commands from the network (for example, base station).

Figure 4:
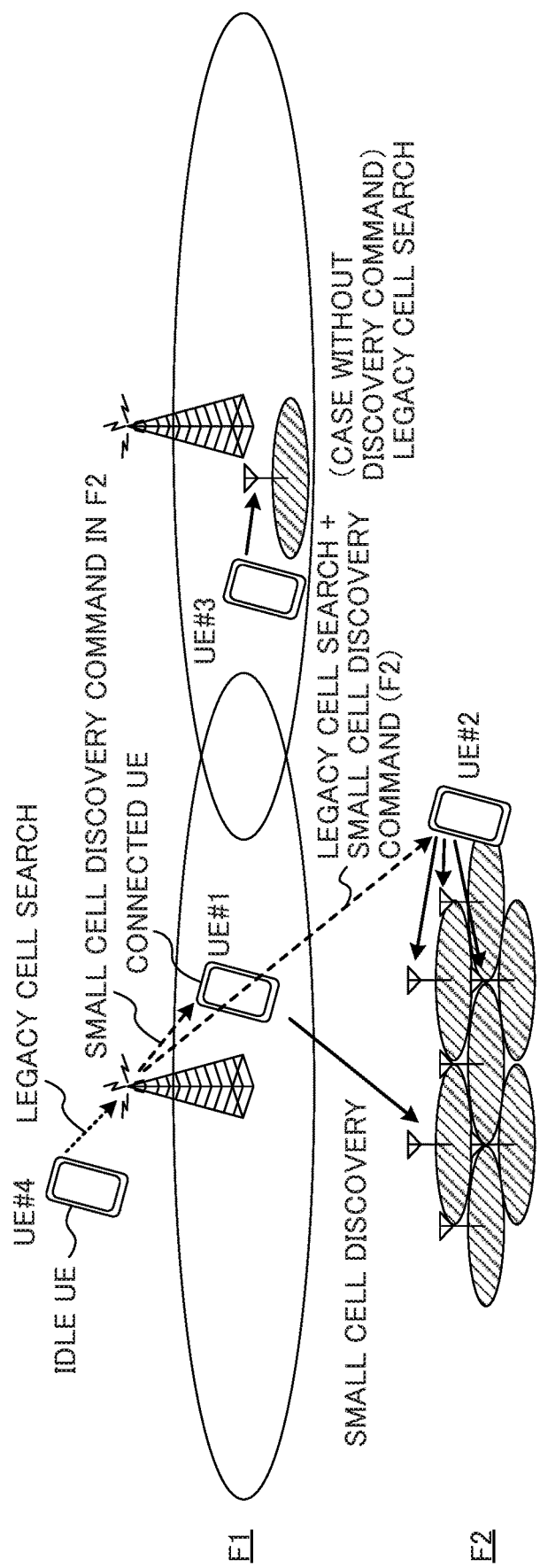
FIG. 4 is a diagram to explain a method of controlling small cell discovery and legacy cell search according to the present embodiment.

FIG. 4 shows a system comprised of small base stations that form small cells, macro base stations that form macro cells which include small cells in their coverage areas, and user terminals that can communicate with the small base stations and the macro base stations. Also, FIG. 4 shows a case where the frequency which the macro cells employ and the frequency which the small cells employ are the same frequency (F1), and a case where the frequency which the macro cells employ (F1) and the frequency which the small cells employ (F2) are different frequencies.

A base station (for example, a macro base station) commands whether or not to carry out small cell discovery in a predetermined frequency (for example, F2) to a user terminal UE #1 that is connected with that base station (connected UE). At this time, the macro base station may also send commands regarding legacy cell search using synchronization signals (SSs) and reference signals (CRSs) transmitted from the small cells, with respect to a predetermined frequency (for example, F2).

FIG. 4 shows a case where a command for small cell discovery using DSs in F2 is given to user terminal #1, and a command for small cell discovery and legacy cell search in F2 is given to a user terminal #2. Also, in F1, it is also possible to employ a structure in which a user terminal #3 to which no small cell discovery is commanded in F1 or a user terminal #4 in idle mode execute legacy cell search.

The macro base station can send the small cell discovery command by using higher layer signaling (for example, RRC signaling). To be more specific, in the macro base station, information as to whether or not to execute small cell discovery using DSs, per frequency, is included in the information element (MeasObjectEUTRA (hereinafter also referred to as "MeasObject")) that defines the measurement object, and reported to a user terminal.

When small cell discovery is executed, the macro base station reports information about the parameters of the discovery/measurement signals (DSs) (for example, transmission timings) to the user terminal. At this time, the macro base station specifies DS timings synchronous with the macro cell (the macro cell's system frame number (SFN), subframe number, transmission cycle). If small cells are synchronous with the macro cell, the user terminal can carry out small cell discovery and so on adequately based on the synchronization information of the macro cell.

Furthermore, the base station may report, as information about DS parameters, parameters (assist information) such as the transmission power, the number of antenna ports, the DS frequency, the bandwidth, the signal configuration and so on, in addition to DS transmission timings, to the user terminals.

By using the assist information that is reported from the base station, the user terminal can adequately learn DS arrival timings and so on and execute DS discovery/measurements efficiently. Note that, in the base station, part or the whole of the above-described assist information may be included in the information element "MeasObject," which defines the measurement object, or may be commanded as "DiscoveryRS-Config," which defines the configuration of the DS signal. Now, the method of reporting small cell discovery commands and assist information will be described in detail below.

<Method 1>

For example, the NW (for example, the macro base station) includes, in MeasObject, a small cell discovery command (DiscoveryConfig), and DS timings (Discovery-SubframePatternConfig) such as the system frame number (SFN), subframe numbers and so on, and reports this to the user terminal. That is, a small cell discovery command and DS parameter-related information such as DS timings are included in the same information element and transmitted. At this time, information about the small cells to be the objet to try discovering (small cell identifier list) may be included in in MeasObject as well.

As for the small cell discovery command (DiscoveryConfig), whether or not small cell discovery and legacy cell search are executed may be included. For example, the base station can command, separately, whether or not the user terminal should carry out legacy cell search in a specified frequency, and whether or not to the user terminal should carry out small cell search (option 1). In this case, four patterns of operations, namely (1) carrying out neither legacy cell search nor small cell discovery, (2) carrying out legacy cell search alone, (3) carrying out small cell discovery alone, and (4) carrying out both legacy cell search and small cell discovery, can be specified with two bits. Note that this two-bit information does not necessarily have to be stipulated in the small cell discovery command (DiscoveryConfig) field. It is equally possible to stipulate one bit in the small cell discovery command (DiscoveryConfig) field and one bit in the legacy cell search command (LegacyConfig) field (total two bits).

Alternatively, the base station commands whether or not the user terminal should carry out small cell search in a specified frequency (option 2). In this case, two patterns of operations, namely (1) not carrying out small cell discovery (carrying out legacy cell search alone) and (2) carrying out small cell discovery, can be specified with one bit. When the base station wants the user terminal to carry out small cell discovery alone, it is only necessary to send a report to the user terminal, in advance, to the effect that legacy cell search is to be skipped when above "(2) carrying out small cell discovery" is reported.

Alternatively, the base station commands whether or not the user terminal should carry out small cell search in a specified frequency, and commands to carry out small cell discovery alone, without performing legacy cell search, if the frequency is not the user terminal's connecting frequency (option 3). In this case, two patterns of operations, namely (1) not carrying out small cell discovery (carrying out legacy cell search alone) and (2) carrying out small cell discovery, can be indicated with one bit. For example, when above "(2) carrying out small cell discovery" is reported to the user terminal, the user terminal compares the specified frequency and the frequency of the communicating state, and, if the frequencies do not match, the user terminal carries out small cell discovery using DS signals, and does not execute legacy cell search.

In this way, by including and transmitting a small cell discovery command and DS parameter-related information such as DS timings in the same information element, a user terminal, when executing small cell discovery, can carry out efficient small cell discovery by using assist information such as DS timings.

<Method 2>

Also, the NW (for example, the macro base station) may include a small cell discovery command (DiscoveryConfig) in MeasObject, and report this to the user terminal, and, meanwhile, include assist information such as the transmission power, the number of antenna ports, the DS frequency, the bandwidth, the signal configuration and so on in the information element (DiscoveryRS-Config) that defines the discovery reference signal configuration, and report this to the user terminal. In this way, by including and transmitting information about DS parameters in a different information element, it becomes possible to reported more detailed information about the discovery reference signals such as the transmission power, the number of antenna ports, the signal configuration and so on, to the user terminal.

When small cell discovery is commanded from the base station (when "execute small cell discovery" is included in MeasObject), the user terminal executes small cell discovery using DSs, in the specified frequency. Otherwise, the user terminal executes legacy cell search alone.

Note that, when a DS timing is specified by the base station, the user terminal can perform small cell discovery in the specified timing with reference to the synchronization with the connecting cell (for example, the macro cell or other small cells).

In a structure in which a plurality of small cells are arranged in a high density, the interference between the cells (for example, interference between the CRSs, interference due to PSS/SSS collisions, etc.) have an impact, and therefore small cell discovery becomes time-consuming when legacy cell search is used. As described above, by commanding small cell discovery to use DSs in a predetermined frequency and/or legacy cell search from a base station to user terminals, it is possible to control small cell discovery adequately, depending on each user terminal's condition of connection.

Also, with the present embodiment, both small cell discovery to use DSs and legacy cell search are commanded from a base station to user terminals, so that the user terminals (for example, user terminal #2 in FIG. 4) becomes capable of discovering/measuring small cells by way of legacy cell search even during the DS transmission cycle. In this way, it is possible to reduce the small cell discovery delay by performing small cell discovery taking into account the discovery/measurement result of legacy cell search.

Second Embodiment

A case will be described here with a second embodiment where the resources to use in small cell discovery (DS transmission) are limited when small cell discovery using DSs and legacy cell search are carried out.

The DS for small cell discovery may be configured freely in the network, without stipulating the transmitting subframes with the specifications on a fixed basis. When the DS transmission cycle is not a multiple of 10 or 5, the locations of subframes in the radio frame that transmits the DS change on a per cycle basis. This may give a threat that existing synchronization signals (PSS/SSS), cell-specific reference signals (CRS), broadcast signals (PBCH), system information (SIB), paging information(Paging) and so on collide with the DSs.

Considering compatibility with existing systems, it may be preferable to prioritize information about the PSS/SSS/CRS/PBCH over DSs. On the other hand, compared to data signals (PDSCH signal) and so on, it may be preferable to prioritize the DS for small cell discovery.

Consequently, a configuration is employed here in which, when there is a possibility that DS resources might collide with the PSS/SSS/CRS/PBCH, SIB, paging and so on, legacy cell search alone is carried out, without performing small cell discovery (DS transmission). The user terminal can operate on the assumption that there is no DS in resources where the PSS/SSS/CRS/PBCH, SIB, paging and so on are allocated. Meanwhile, small cell discovery is performed on the assumption that the resource elements to use for DSs are not used in PDSCH transmission.

For example, as has been shown with the above first embodiment, when the NW (base station) commands small cell discovery by using MeasObject and so on, the resources (system frame number, subframe number or the combination of these) that are not subject to small cell discovery are indicated to the user terminal.

With reference to the synchronization with the connecting cell (for example, the macro cell), the user terminal can execute legacy cell search alone, without executing small cell discovery in the resources specified by the base station.

Third Embodiment

With a third embodiment, small cell discovery commands for user terminals in idle mode will be described.

Even with user terminals that are in idle mode and not connected with base stations (user terminals not in connected mode), from the perspective of inter-frequency cell reselection and location estimation, execution of small cell discovery using DSs is effective. In particular, the load of small cell discovery using DSs is lighter than that of conventional cell search and measurements, so that the impact on the battery of user terminals in idle mode is also less.

Figure 5:
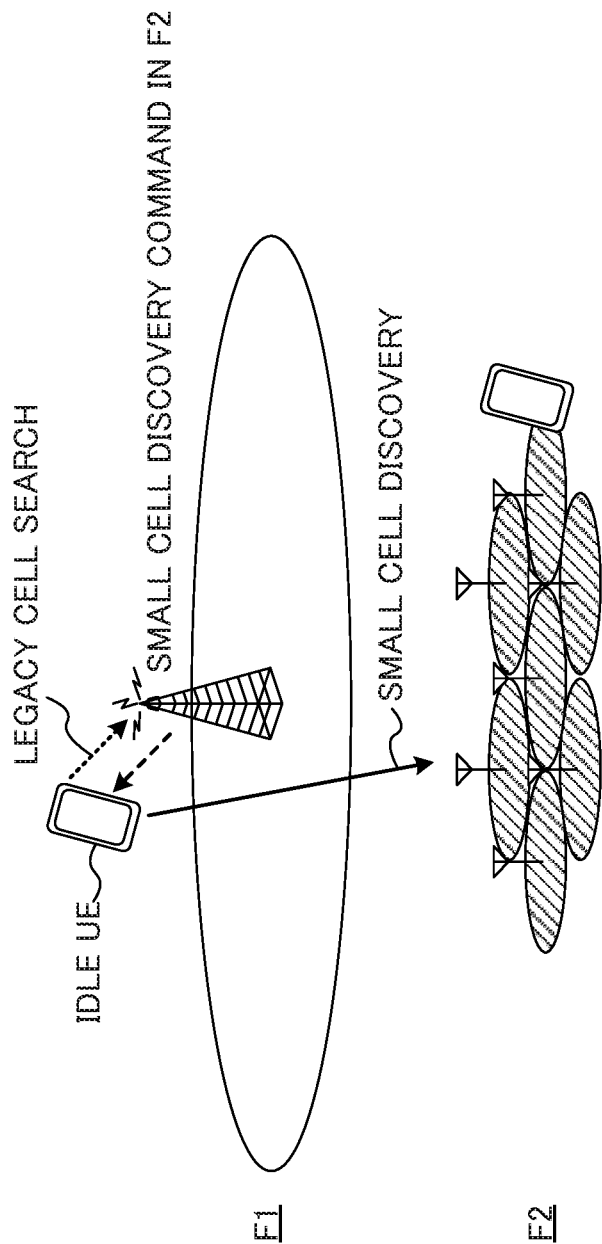
FIG. 5 is a diagram to explain the small cell discovery operation in a user terminal in idle mode, according to the present embodiment.

Meanwhile, for user terminals in idle mode, it is not possible to use RRC signaling as described above. Consequently, according to the third embodiment, the small cell discovery frequency, timing and so on are reported to user terminals in idle mode, by using broadcast information from the macro cell (see FIG. 5).

For example, the base station additionally specifies the discovery frequency (DiscoveryFrequency), the discovery subframe pattern configuration (DiscoverySubframePattern-Config) and so on in the system information block (SIB-X), and reports this to user terminals. By this means, even user terminals in idle mode can adequately learn DS arrival timings in small cells and so on based on reports from the macro cell, and perform DS discovery/measurements efficiently.

Fourth Embodiment

With a fourth embodiment, the transmission control for measurement reports in response to measurement results acquired in legacy cell search and in small cell discovery (for example, the receiving state (RSRP/RSRQ, etc.)) in user terminals will be described.

When a user terminal carries out legacy cell search and small cell discovery separately, the cell ID/RSRP/RSRQ corresponding to a predetermined cell acquired by the legacy cell search, and the cell identifier/RSRP/RSRQ corresponding to the predetermined cell acquired by the small cell discovery, are given. In this case, the user terminal can report the measurement results to the base station (NW), as measurement reports, by using one of following methods 1 to 3.

<Method 1>

The user terminal transmits both the result acquired from legacy cell search and the result acquired from small cell discovery to the base station as measurement reports. In this case, the base station can acquire more information regarding the receiving states of the user terminal and the small cell base stations. In this case, the user terminal may transmit the result acquired from legacy cell search and the result acquired from small cell discovery at the same timing or at different timings.

<Method 2>

In the result acquired from legacy cell search and the result acquired from small cell discovery, as for the cell identifiers (for example, cell IDs), the user terminal transmits the information that is discovered in each cell, and, as for the receiving states, the result of small cell discovery is prioritized and transmitted to the base station as a measurement report. That is, when there is a cell identifier (for example, a cell ID) that is discovered in legacy cell search, this cell identifier is added to the result of small ell discovery and reported.

In this way, it becomes possible to reduce the increase of report size by transmitting only the result of small cell discovery as receiving state information. Method 2 is particularly effective when small cell discovery shows higher accuracy of discovery/measurements than legacy cell search.

<Method 3>

Given the result acquired from legacy cell search and the result acquired from small cell discovery, the user terminal transmits the result of legacy cell search on an as-is basis, and, as for the result of small cell discovery, only the cell identifiers (for example, cell IDs) that were not discovered in legacy cell search are transmitted. By transmitting the result of legacy cell search alone with respect to the receiving state information, it is possible to reduce the increase of report size. Method 3 is particularly effective when, as has been heretofore, the result of legacy cell search is used as a base and the result of small cell discovery is transmitted as supplementary information.

Also, when the user terminal transmits the result acquired from legacy cell search and/or the result acquired from small cell discovery as a measurement report, the user terminal can employ the method of sending reports periodically or the method of sending reports when a predetermined condition (event trigger) is fulfilled.

When the method of sending measurement reports when a measurement result fulfills a predetermined condition is employed, it is preferable to configure separate predetermined conditions (event triggers) for the result acquired from legacy cell search and the result acquired from small cell discovery.

For example, for the result acquired from small cell discovery (RSRP/RSRQ etc.), the following event trigger can be configured:

(1) Event A1-ds: as a result of small cell discovery, the serving cell (Serving) exceeds the threshold (2) Event A2-ds: as a result of small cell discovery, the serving cell (Serving) falls below the threshold (3) Event A3-ds: as a result of small cell discovery, the difference between a neighboring cell (Neighbor) and the PCell exceeds the offset (4) Event A4-ds: as a result of small cell discovery, a neighboring cell (Neighbor) exceeds the threshold (5) Event A5-ds: as a result of small cell discovery, the PCell falls below threshold 1 and a neighboring cell (Neighbor) exceeds a threshold 2

(6) Event A6-ds: as a result of small cell discovery, the difference between a neighboring cell (Neighbor) and the SCell exceeds the offset Note that, for the above-described event triggers, it is possible to specify each event trigger, or specify the threshold, separately, for every frequency of the measurement object (MeasObject). Also, the serving cell refers to the connecting cell, and the threshold to use in the PCell frequency in the above events A1 and A2 and the threshold to use in the SCell frequency can be specified separately.

Note that in the above-noted event triggers, in events A3, A5, A6 and so on, cases might occur where the legacy cell search measurement result and the result acquired in small cell discovery are compared. For example, in events A3, A5 and A6, legacy cell search and small cell discovery both take place between a neighboring cell and the PCell/S Cell.

In this case, the user terminal may compare each result directly, or compare these by adding an offset to one result (for example, the result of small cell discovery) based on received quality and so on. Information about the offset can be reported from the base station to the user terminal. By making a comparison by applying an offset to one result based on received quality and so on, the user terminal can adequately compare the results of measurements acquired from different signals, so that it is possible to control measurement report triggers with high accuracy.

(Structure of Radio Communication System)

Now, a structure of a radio communication system according to the present embodiment will be described below.

Figure 6:
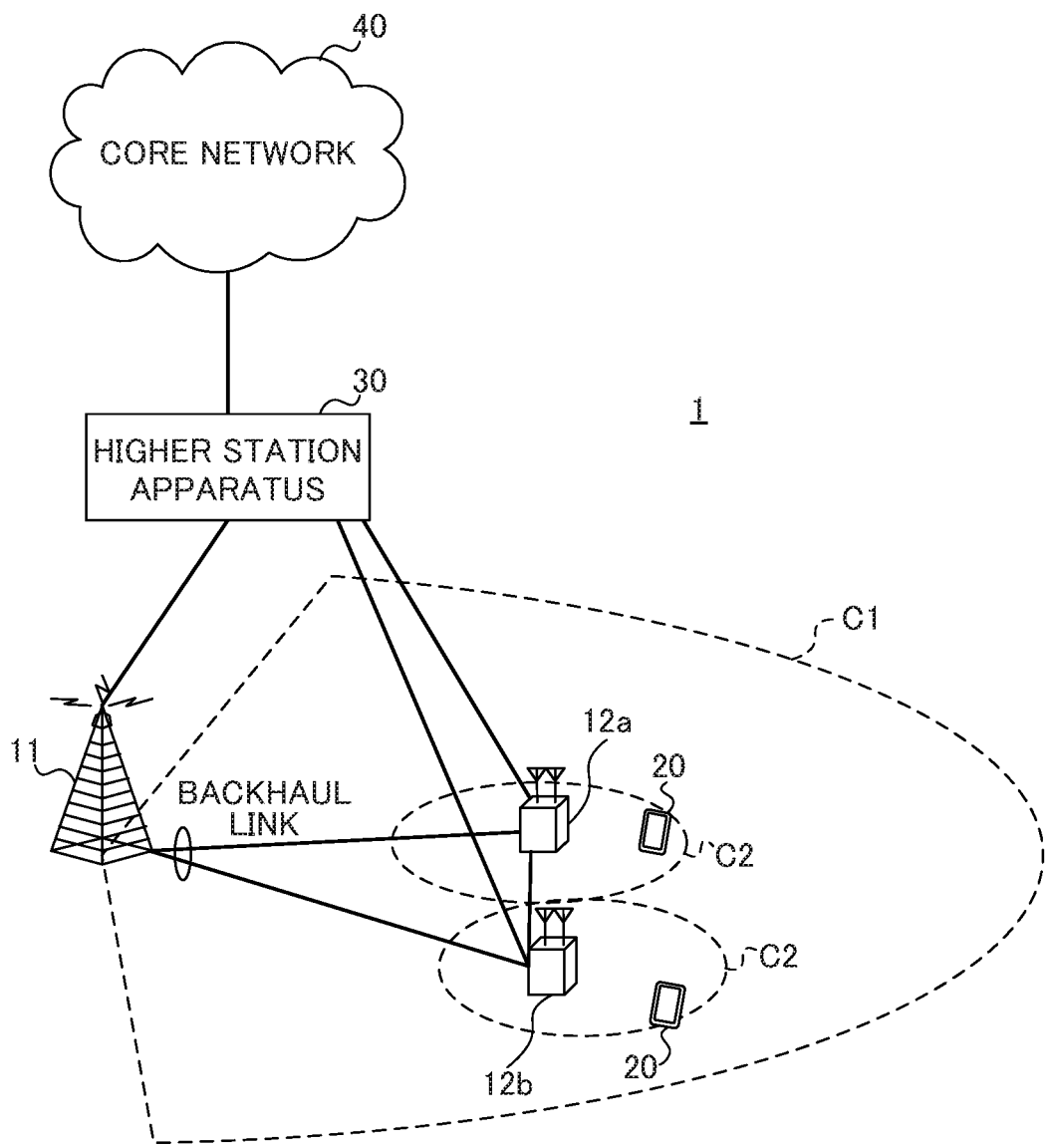
FIG. 6 is a schematic diagram to show an example of a radio communication system according to the present embodiment.

FIG. 6 is a schematic configuration diagram of a radio communication system according to the present embodiment. As shown in FIG. 6, a radio communication system 1 includes a macro base station 11 that forms a macro cell C1, and small base stations 12a and 12b that form small cells C2, which are placed within the macro cell C1 and which are narrower than the macro cell C1. User terminals 20 are structured to be capable of carrying out radio communication with at least one of the macro base station 11 and the small base stations 12a and 12b (hereinafter collectively referred to as "small base stations 12"). Note that the number of macro base stations 11 and small base stations 12 is by no means limited to the number illustrated in FIG. 6.

The macro cell C1 and the small cells C2 may use the same frequency band or may use different frequency bands. Also, the macro base station 11 and each small base station 12 are connected with each other via an inter-base station interface (for example, optical fiber, X2 interface, etc.). The macro base station 11 and the small base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these.

Note that the macro base station 11 is a radio base station having a relatively wide coverage, and may be referred to as an "eNodeB (eNB)," a "radio base station," a "transmission point" and so on. The small base stations 12 are radio base stations that have local coverages, and may be referred to as "RRHs (Remote Radio Heads)," "pico base stations," "femto base stations," "HeNBs (Home eNodeBs)," "transmission points," "eNodeBs (eNBs)" and so on. The user terminals 20 are terminals to support various communication schemes such as LTE and LTE-A, and may not only be mobile communication terminals, but may also be stationary communication terminals as well.

Also, in the radio communication system 1, as radio access schemes, OFDMA (Orthogonal Frequency Division Multiple Access) is applied to the downlink, and SC-FDMA (Single-Carrier Frequency Division Multiple Access) is applied to the uplink.

Also, in the radio communication system 1, a downlink shared channel (PDSCH: Physical Downlink Shared Channel), which is used by each user terminal 20 on a shared basis, a downlink control channel (PDCCH (Physical Downlink Control Channel), an EPDCCH (Enhanced Physical Downlink Control Channel), a PCFICH, a PHICH, a broadcast channel (PBCH) and so on are used as downlink communication channels. User data and higher layer control information are communicated by the PDSCH. Downlink control information (DCI) is communicated by the PDCCH and the EPDCCH.

Also, in the radio communication system 1, as uplink communication channels, an uplink shared channel (PUSCH: Physical Uplink Shared Channel) that is used by each user terminal 20 on a shared basis, an uplink control channel (PUCCH: Physical Uplink Control Channel) and so on are used. User data and higher layer control information are communicated by the PUSCH. Also, by means of the PUCCH, downlink radio quality information (CQI: Channel Quality Indicator), delivery acknowledgement information (ACK/NACK) and so on are communicated.

The macro base station 11 and the small base stations 12 will be hereinafter collectively referred to as "radio base station 10," unless specified otherwise.

Figure 7:
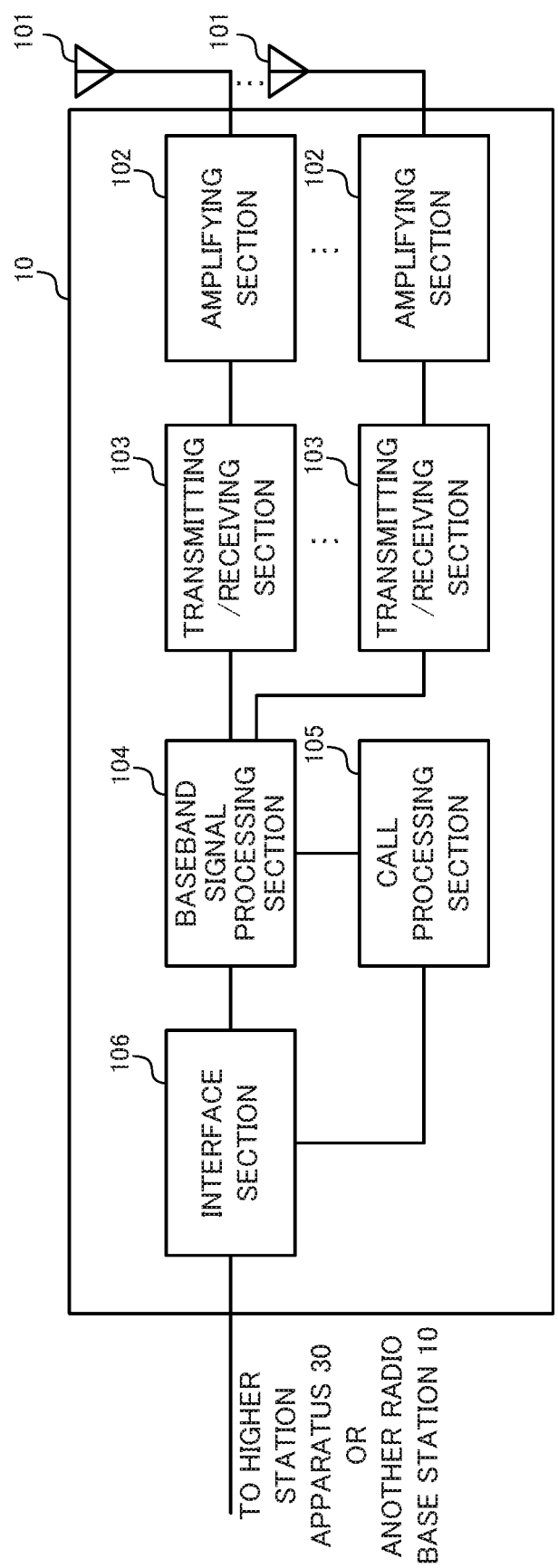
FIG. 7 is a diagram to explain an overall structure of a radio base station according to the present embodiment.

FIG. 7 is a diagram to show an overall structure of a radio base station 10 according to the present embodiment. The radio base station 10 has a plurality of transmitting/receiving antennas 101 for MIMO communication, amplifying sections 102, transmitting/receiving sections 103, a baseband signal processing section 104, a call processing section 105 and an interface section 106.

User data to be transmitted from the radio base station 10 to a user terminal 20 on the downlink is input from the higher station apparatus 30, into the baseband signal processing section 104, via the interface section 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a pre-coding process are performed, and the result is forwarded to each transmitting/receiving section 103. Furthermore, downlink control signals are also subjected to transmission procedures such as channel coding and an inverse fast Fourier transform, and are forwarded to each transmitting/receiving section 103.

Each transmitting/receiving section 103 converts the downlink signals, which are pre-coded and output from the baseband signal processing section 104 on a per antenna basis, into a radio frequency band. The amplifying sections 102 amplify the radio frequency signals having been subjected to frequency conversion, and transmit the signals through the transmitting/receiving antennas 101.

On the other hand, as for uplink signals, radio frequency signals that are received in the transmitting/receiving antennas 101 are each amplified in the amplifying sections 102, converted into baseband signals through frequency conversion in each transmitting/receiving section 103, and input into the baseband signal processing section 104.

In the baseband signal processing section 104, the user data that is included in the input uplink signals is subjected to an FFT process, an IDFT process, error correction decoding, a MAC retransmission control receiving process and RLC layer and PDCP layer receiving processes, and the result is forwarded to the higher station apparatus 30 via the interface section 106. The call processing section 105 performs call processing such as setting up and releasing communication channels, manages the state of the radio base stations 10 and manages the radio resources.

The interface section 106 transmits and receives signals to and from neighboring radio base stations (backhaul signaling) via an inter-base station interface (for example, optical fiber, X2 interface, etc.). For example, data is transmitted and received between the macro base station 11 and the small base stations 12 via the interface section 106. Alternatively, the interface section 106 transmits and receives signals to and from the higher station apparatus 30 via a predetermined interface.

Figure 8:
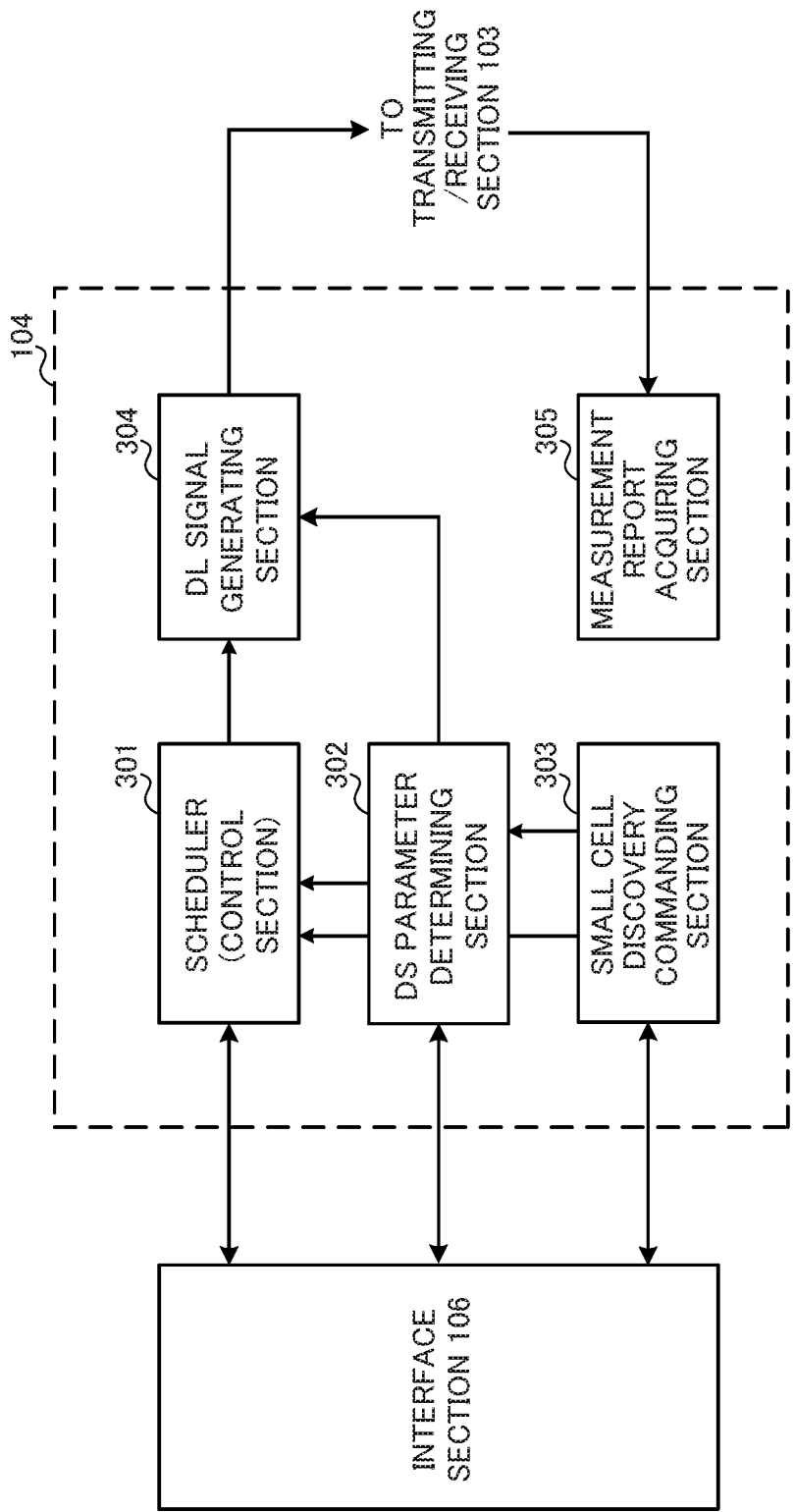
FIG. 8 is a diagram to explain a functional structure of a macro base station according to the present embodiment.

FIG. 8 is a diagram to show a functional structure of a macro base station 11 according to the present embodiment. Note that the following functional structure is formed with the baseband signal processing section 104 provided in the macro base station 11 and so on.

As shown in FIG. 8, the macro base station 11 has a scheduler (control section) 301, a DS parameter determining section 302, a small cell discovery commanding section 303, a DL signal generating section 304, a measurement report acquiring section 305 and so on.

The scheduler 301 allocates (schedules) the radio resources for DL signals to transmit to the user terminal 20 and the radio resources for UL signals to be transmitted from the user terminal 20. For example, with respect to the user terminal 20, when small cell discovery is performed, the scheduler 301 commands the DL signal generating section 304 to generate information about DS parameters (assist information such as transmission timings).

In this case, the scheduler 301 can execute control so that, as has been shown with the above first embodiment, a small cell discovery command (DiscoveryConfig), and DS timings (DiscoverySubframePatternConfig) such as the system frame number (SFN) and subframe numbers and so on can be included in MeasObject (above-described method 1 of the first embodiment). Alternatively, the scheduler 301 can execute control so that, while a small cell discovery command (DiscoveryConfig) is included in MeasObject and transmitted to the user terminal, assist information such as the transmission power, the number of antenna ports, the DS frequency, the bandwidth, the signal configuration and so on are also included in the information element (DiscoveryRSConfig) that defines the discovery reference signal configuration (above-described method 2 of the first embodiment).

The small cell discovery commanding section 303 controls commands for small cell discovery using DSs for user terminals. For example, the small cell discovery commanding section 303 commands a user terminal (Connected UE) that is connected to the macro base station 11 as to whether or not to perform small cell discovery in a predetermined frequency (for example, F2). Also, the small cell discovery commanding section 303 also sends a command for legacy cell search using synchronization signals (SSs) and reference signals (CRSs) transmitted from the small cells, with respect to the predetermined frequency (for example, F2).

When commanding the user terminal to execute small cell discovery using DSs, the DS parameter determining section 302 determines information about DS parameters. The information about DS parameters includes parameters (assist information) such as DS transmission timings, the transmission power, the number of antenna ports, the DS frequency, the bandwidth, the signal configuration and so on. The information that is determined in the DS parameter determining section 302 is output to the scheduler 301 and the DL signal generating section 304.

The DL signal generating section 304 generates DL signals based on commands from the scheduler 301 and the DS parameter determining section 302. The signals generated in the DL signal generating section 305 are transmitted to the user terminal 20 via the transmitting/receiving section 103.

The measurement report acquiring section 305 acquires measurement reports sent from the user terminal. The measurement report acquiring section 305 acquires at least part of the result acquired from legacy cell search in the user terminal and the result acquired from small cell discovery using DSs, each as a measurement report. Then, the measurement report acquiring section 305 controls the connection of the user terminal with the small cells based on the measurement reports.

Figure 9:
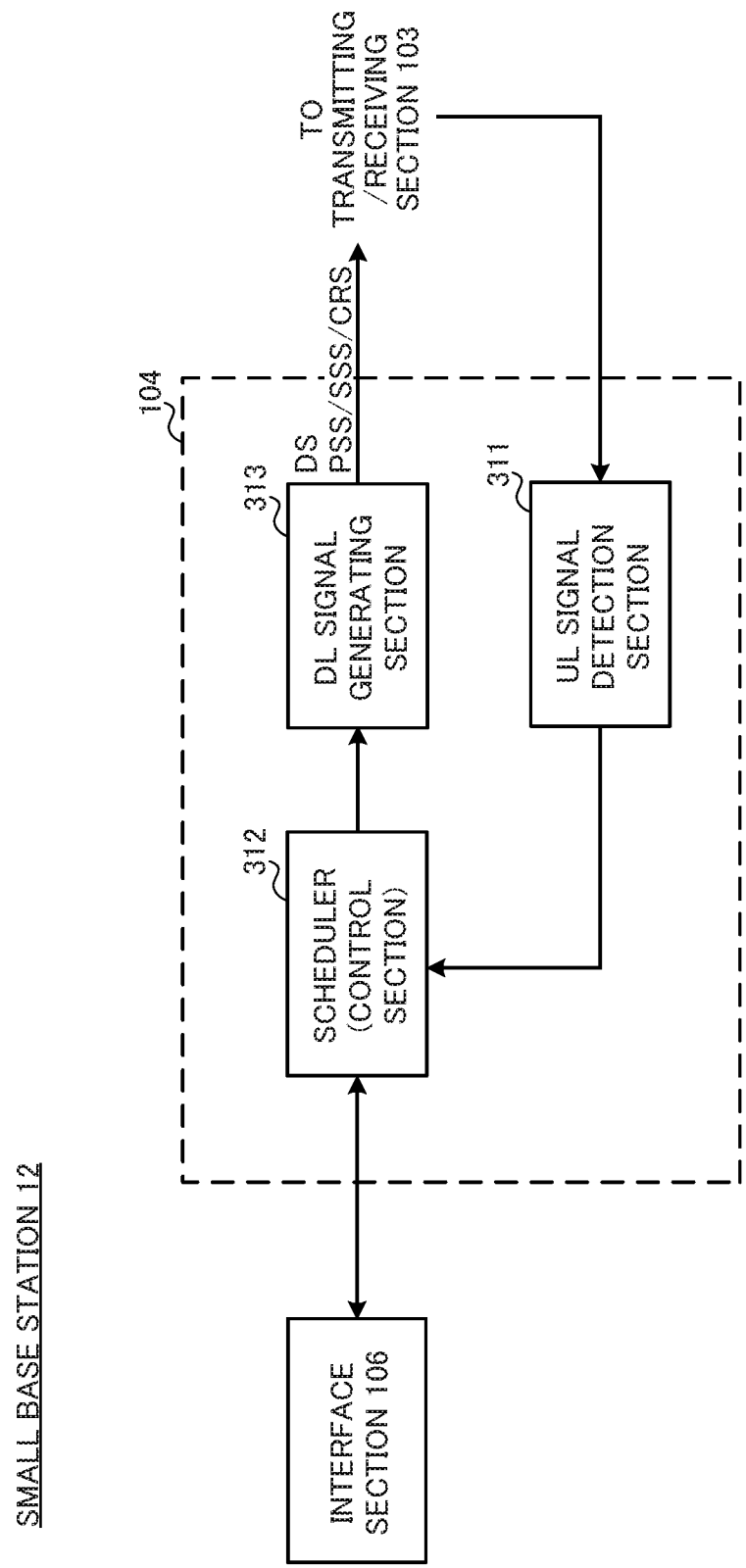
FIG. 9 is a diagram to explain a functional structure of a small base station according to the present embodiment.

FIG. 9 is a diagram to show a functional structure of a small base station 12 according to the present embodiment. Note that the following functional structure is comprised of the baseband signal processing section 104 provided in the small base station 12 and so on.

As shown in FIG. 9, the small base station 12 has a UL signal detection section 311, a scheduler 312, a DL signal generating section 313 and so on.

The UL signal detection section 311 detects UL signals that are transmitted from the user terminal. The UL signal detection section 311 can also receive measurement reports sent from the user terminal.

The scheduler 312 allocates (schedules) the radio resources for DL signals to transmit to the user terminal 20. Also, the scheduler 312 controls the transmission of discovery/measurement signals (DSs).

The DL signal generating section 313 generates DL signals based on commands from the scheduler 312. For example, the DL signal generating section 313 generates synchronization signals (PSS/SSS), reference signals (CRS), measurement/discovery signal (DSs), control signals, data signals and so on. The signals generated in the DL signal generating section 313 are transmitted to the user terminal 20 via the transmitting/receiving section 103.

Figure 10:
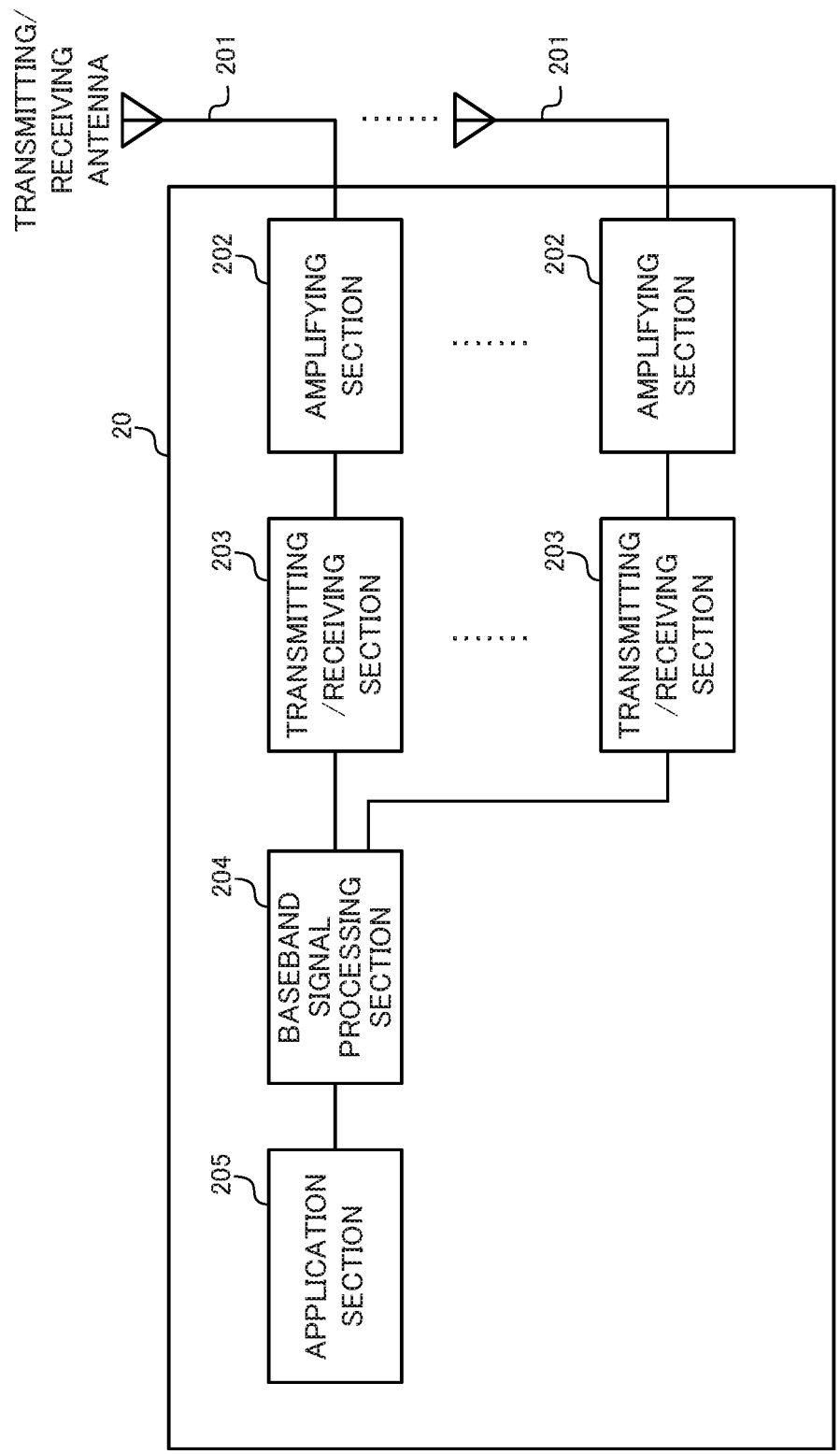
FIG. 10 is a diagram to explain an overall structure of a user terminal according to the present embodiment.

FIG. 10 is a diagram to show an overall structure of a user terminal 20 according to the present embodiment. The user terminal 20 has a plurality of transmitting/receiving antennas 201 for MIMO communication, amplifying sections 202, transmitting/receiving sections (receiving sections) 203, a baseband signal processing section 204 and an application section 205.

As for downlink data, radio frequency signals that are received in a plurality of transmitting/receiving antennas 201 are each amplified in the amplifying sections 202, and subjected to frequency conversion and converted into the baseband signal in the transmitting/receiving section 203. This baseband signal is subjected to an FFT process, error correction decoding, a retransmission control receiving process and so on in the baseband signal processing section 204. In this downlink data, downlink user data is forwarded to the application section 205. The application section 205 performs procedures related to higher layers above the physical layer and the MAC layer. Furthermore, the broadcast information in the downlink data is also forwarded to the application section 205.

Meanwhile, uplink user data is input from the application section 205 into the baseband signal processing section 204. The baseband signal processing section 204 performs a retransmission control (HARQ (Hybrid ARQ)) transmission process, channel coding, pre-coding, a DFT process, an IFFT process and so on, and the result is forwarded to each transmitting/receiving sections 203. Baseband signals that are output from the baseband signal processing section 204 are converted into a radio frequency band in the transmitting/receiving sections 203. After that, the amplifying sections 202 amplify the radio frequency signals having been subjected to frequency conversion, and transmit the result from the transmitting/receiving antennas 201.

Figure 11:
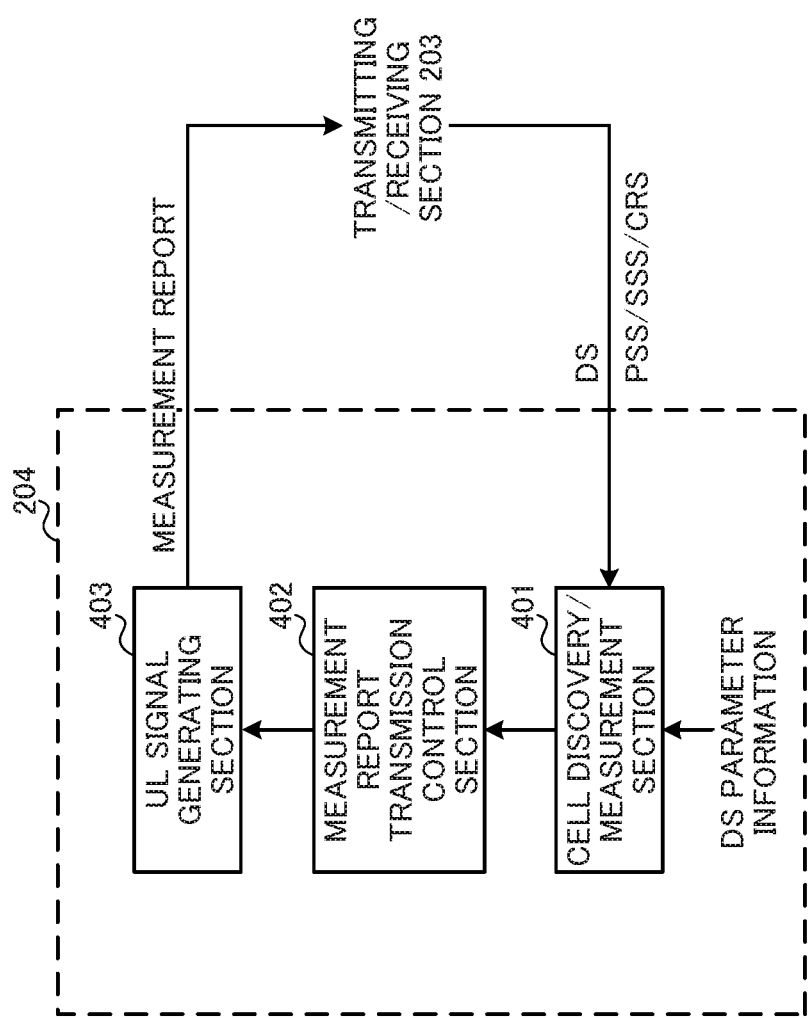
FIG. 11 is a diagram to explain a functional structure of a user terminal according to the present embodiment.

FIG. 11 is a diagram to show a principle functional structure of the baseband signal processing section 204 provided in the user terminal 20. As shown in FIG. 11, the baseband signal processing section 204 provided in the user terminal 20 at least has a cell discovery/measurement section 401, a measurement report transmission control section 402 and a UL signal generating section 403.

The cell discovery/measurement section 401 performs legacy cell search using synchronization signals (PSS/SSS) and reference signals (CRSs) transmitted from the small base station 12, and small cell discovery using discovery/measurement signals (DSs). Also, the cell discovery/measurement section 401 receives information related to commands for legacy cell search and/or small cell discovery, from the macro base station 11, via RRC signaling (the above first embodiment). Also, the cell discovery/measurement section 401, when carrying out small cell discovery, discovers the DSs based on the DS parameter-related information (assist information) that is reported from the macro base station 11.

Furthermore, the cell discovery/measurement section 401 can perform legacy cell search on the assumption that there are no DSs in resources where the PSS/SSS/CRS/PBCH, SIB, paging and so on are allocated. In the meantime, the cell discovery/measurement section 401 performs small cell discovery on the assumption that the resource elements used for DSs are not used for PDSCH transmission (the above second embodiment). Also, when the user terminal 20 is in idle mode, the cell discovery/measurement section 401 performs small cell discovery based on broadcast signals transmitted from the macro base station 11 (the above third embodiment).

The measurement report transmission control section 402 controls the transmission of the result of the legacy cell search that was carried out in the cell discovery/measurement section 401 and the result of the small cell discovery, as measurement reports. When legacy cell search and small cell discovery are carried out separately, for example, the measurement report transmission control section 402 acquires the cell ID/RSRP/RSRQ corresponding to a predetermined cell, acquired by legacy cell search, and the cell identifier/RSRP/RSRQ corresponding to the predetermined cell, acquired by small cell discovery. In this case, the measurement report transmission control section 402 executes control so that the measurement results are reported to the base station (NW) as measurement reports by using one of above-described methods 1 to 3 of the fourth embodiment.

The measurement report transmission control section 402 controls the transmission of measurement reports based on predetermined conditions (event triggers) that are configured separately for the result acquired in legacy cell search and the result acquired in small cell discovery (the above fourth embodiment).

The UL signal generating section 403 generates measurement reports and so on based on commands from the measurement report transmission control section 402. Furthermore, the UL signal generating section 403 also generates uplink control signals such as delivery acknowledgement signals, and uplink data signals.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention. That is to say, the description herein is provided only for the purpose of explaining embodiment s, and should by no means be construed to limit the present invention in any way. Also, the embodiment s described above may be combined and implemented as appropriate.

The invention claimed is:

1. A terminal comprising:
a receiver that receives, in a first cell that is a macro cell, information indicating a measurement object including information regarding a parameter of a discovery or measurement signal;
a processor that performs a measurement using the discovery or measurement signal based on the information indicating the measurement object; and
a transmitter that transmits a result of the measurement,
wherein when the information indicating the measurement object designates a timing that is synchronous with the first cell, the processor performs the measurement in a second cell that is a small cell based on the timing that is synchronous with the first cell, and
wherein when a designation of a measurement, which uses a synchronization signal, is included in the information indicating the measurement object, the transmitter transmits the result of the measurement using the discovery or measurement signal, and transmits the result of the measurement including a cell identifier.

2. A radio communication method for a terminal comprising:
receiving, in a first cell that is a macro cell, information indicating a measurement object including information regarding a parameter of a discovery or measurement signal;
performing a measurement using the discovery or measurement signal based on the information indicating the measurement object; and
transmitting a result of the measurement,
wherein when the information indicating the measurement object designates a timing that is synchronous with the first cell, the measurement is performed in a second cell that is a small cell based on the timing that is synchronous with the first cell, and
wherein in response to a command of a measurement, which uses a synchronization signal for a cell search, being included in the information indicating the measurement object, the terminal transmits the result of the measurement using the discovery or measurement signal, and transmits the result of the measurement including a cell identifier.

3. A base station comprising:
a transmitter that transmits, in a first cell that is a macro cell, information indicating a measurement object including information regarding a parameter of a discovery or measurement signal;
a processor that controls a performing of a measurement using the discovery or measurement signal based on the information indicating the measurement object; and
a receiver that receives a result of the measurement,
wherein when the information indicating the measurement object designates a timing that is synchronous with the first cell, the processor commands a terminal to perform the measurement in a second cell that is a small cell based on the timing that is synchronous with the first cell, and
wherein when a designation of a measurement, which uses a synchronization signal, is included in the information indicating the measurement object, the receiver receives the result of the measurement using the discovery or measurement signal, and receives the result of the measurement including a cell identifier.

4. A system comprising a terminal and a base station, wherein
the terminal comprises:
a receiver that receives, in a first cell that is a macro cell, information indicating a measurement object including information regarding a parameter of a discovery or measurement signal;
a processor that performs a measurement using the discovery or measurement signal based on the information indicating the measurement object; and
a transmitter that transmits a result of the measurement,
wherein when the information indicating the measurement object designates a timing that is synchronous with the first cell, the processor performs the measurement in a second cell that is a small cell based on the timing that is synchronous with the first cell, and
wherein when a designation of a measurement, which uses a synchronization signal, is included in the information indicating the measurement object, the transmitter transmits the result of the measurement using the discovery or measurement signal, and transmits the result of the measurement including a cell identifier, and
the base station comprises:
a transmitter that transmits, in the first cell, the information indicating the measurement object;
a processor that controls a performing of the measurement using the discovery or measurement signal based on the information indicating the measurement object; and
a receiver that receives the result of the measurement,
wherein when the information indicating the measurement object designates the timing that is synchronous with the first cell, the processor commands the terminal to perform the measurement in the second cell based on the timing that is synchronous with the first cell.

* * * * *